United States Patent [19]
Bosisio et al.

[11] Patent Number: 5,140,664
[45] Date of Patent: Aug. 18, 1992

[54] OPTICAL FIBER CABLES AND COMPONENTS THEREOF CONTAINING AN HOMOGENEOUS BARRIER MIXTURE SUITABLE TO PROTECT OPTICAL FIBERS FROM HYDROGEN, AND RELATIVE HOMOGENEOUS BARRIER MIXTURE

[75] Inventors: Claudio Bosisio, Brembate Sotto; Antonio Campana, Milan, both of Italy

[73] Assignee: Pirelli Cavi S.p.A., Milan, Italy

[21] Appl. No.: 722,085

[22] Filed: Jun. 27, 1991

[30] Foreign Application Priority Data

Jul. 2, 1990 [IT] Italy .................. 20834 A/90

[51] Int. Cl.$^5$ .................. G02B 6/44; H02G 15/00
[52] U.S. Cl. .................. 385/109; 385/100; 385/112; 385/113; 385/141; 523/173
[58] Field of Search .............. 385/109, 110, 111, 112, 385/100, 141; 523/173

[56] References Cited

U.S. PATENT DOCUMENTS

| | | | |
|---|---|---|---|
| 4,143,942 | 3/1979 | Anderson | 385/113 |
| 4,153,332 | 5/1979 | Longoni | 385/113 |
| 4,199,224 | 4/1980 | Oestreich | 385/103 |
| 4,491,386 | 1/1985 | Negishi et al. | 385/110 |
| 4,491,387 | 1/1985 | Dey et al. | 385/113 |
| 4,676,590 | 6/1987 | Priaroggia | 385/113 |
| 4,688,889 | 8/1987 | Pasini et al. | 385/109 |
| 4,690,498 | 9/1987 | Priaroggia | 385/113 |
| 4,715,678 | 12/1987 | Johnson et al. | 385/109 |
| 4,717,236 | 1/1988 | Dewing | 385/109 |
| 4,725,122 | 2/1988 | Anelli et al. | 385/100 |
| 4,725,123 | 2/1988 | Anelli et al. | 385/100 |
| 4,741,592 | 5/1988 | Secco et al. | 385/100 |

FOREIGN PATENT DOCUMENTS

| | | | |
|---|---|---|---|
| 0046907 | 10/1982 | European Pat. Off. | 523/173 X |
| 0157488 | 10/1985 | European Pat. Off. | 385/128 X |
| 0164238 | 12/1985 | European Pat. Off. | 385/128 X |
| 0200914 | 12/1986 | European Pat. Off. | 523/173 X |
| 0217066 | 4/1987 | European Pat. Off. | 385/109 X |

*Primary Examiner*—Brian Healy
*Attorney, Agent, or Firm*—Brooks Haidt Haffner & Delahunty

[57] ABSTRACT

An optical fibers cable and the relative components comprise a barrier mixture to protect the optical fibers; the barrier mixture is a further object of the invention and consists of an homogeneous phase comprising (a) at least a silicon unsaturated organic compound having more than 0.2 mmoles of unsaturated groups per 100 g of the compound, (b) at least a catalyst selected from the group comprising inorganic and organic complexes of transition metals and organic salts of transition metals, and (c) at least an organic solvent substantially non-volatile.

45 Claims, 2 Drawing Sheets

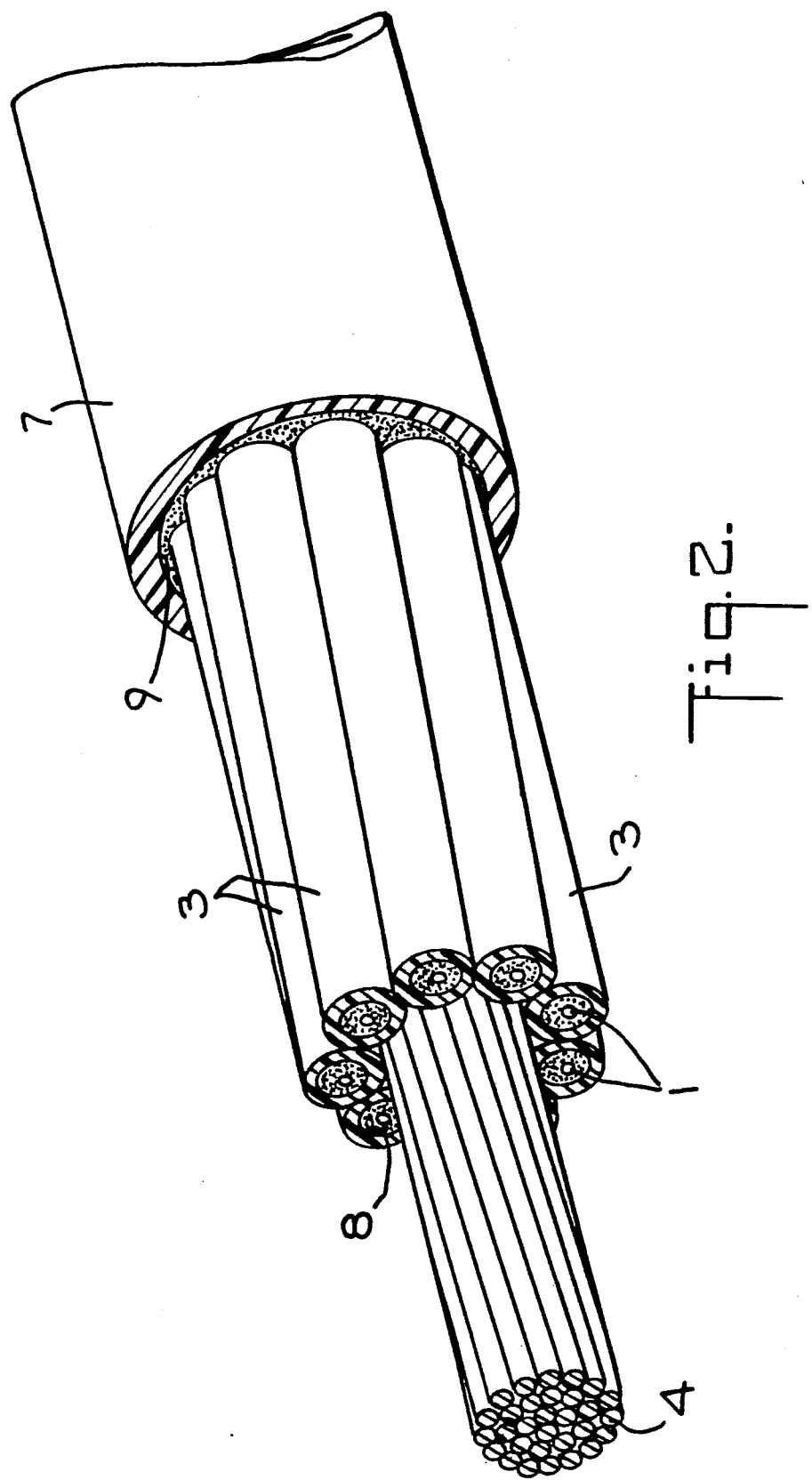

OPTICAL FIBER CABLES AND COMPONENTS THEREOF CONTAINING AN HOMOGENEOUS BARRIER MIXTURE SUITABLE TO PROTECT OPTICAL FIBERS FROM HYDROGEN, AND RELATIVE HOMOGENEOUS BARRIER MIXTURE

BACKGROUND OF THE INVENTION

This invention relates to optical fiber cables and components thereof containing a homogeneous barrier composition suitable to protect optical fibers from hydrogen; it also relates to said homogeneous barrier composition suitable to protect optical fibers from hydrogen.

It is known that hydrogen is detrimental to optical fibers of optical cables and impairs their efficiency. Some compositions able to capture hydrogen before it contacts the optical fibres of optical cables have been therefore proposed. U.S. Pat. No. 4,688,889 teaches to capture hydrogen by means of an hydrogen fixing filler for cables and components thereof containing such filler which comprises:

(a) at least an unsaturated organic silicone having more than 0.2 mmoles of unsaturated groups per 100 g of said compound and having the following general formula:

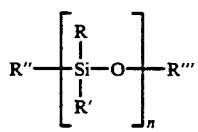

wherein:
R and R' are selected from saturated or unsaturated aliphatic radicals and aromatic radicals,
R" and R''' are aliphatic unsaturated radicals, and
n is an integer; and
(b) at least a catalyst selected from the group consisting of transition metals, inorganic and organometallic salts of transition metals and organometallic acids of transition metals.

As it is also apparent from the pertinent examples, the catalysts according to said patent are typically in the form of powders, either free or supported onto suitable solid inert materials.

In turn, UK-A-2,172,410 teaches to capture hydrogen with a hydrogen trapping powder which is free or, preferably, supported on a flexible film of paper or polymeric material. As an example of a powder suitable for capturing hydrogen, the said patent mentions palladium on carbon.

Furthermore, it is also known that microbendings substantially reduce optical fibres efficiency (G. Grasso et al. "Microbending effects in single mode optical cables"—International Wire & Cable Symposium Proceedings 1988).

Now, it has been found that the particles of the powders forming the materials of U.S. Pat. No. 4,688,889 and UK-A-2172410 cause microbendings when they are contacted with optical fibres. Said materials are thus less effective than they could be if they were directly contacted with the optical fibres; moreover, also the manufacturing of optical cables is more difficult than it could be if a composition were available, directly applicable in contact with the optical fibres to exert an effective barrier function against hydrogen without causing the drawbacks (microbendings) of known compositions.

On the other hand, it does not appear that any composition was disclosed consisting of a homogeneous phase comprising a silicon unsaturated organic compound of formula I and a hydrogenation catalyst having high hydrogen adsorbing power.

SUMMARY OF THE INVENTION

Therefore, this invention aims to provide a composition having all the above cited features for use in the production of optical cables and components thereof.

This object has been surprisingly achieved with an homogeneous barrier mixture capable of chemically absorbing hydrogen, thus protecting from said gas the optical fibers of optical cables, characterized in that it consists of an homogeneous phase comprising:

(a) at least a silicon unsaturated organic compound having more than 0.2 mmoles of unsaturated groups per 100 g of said compound and having the following general formula:

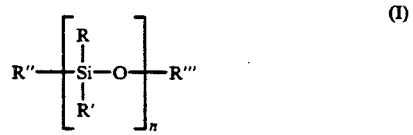

wherein
R and R', which may be the same or different, are alkyl, alkenyl or aryl
R" and R''', which may be the same or different, are alkenyl,
and n is an integer;
(b) at least a catalyst selected from the group comprising inorganic and organic complexes of transition metals and organic salts of transition metals; and
(c) at least an organic solvent substantially non-volatile.

In the present description and in the appended claims, the expression "organic substantially non-voltile solvent" means an organic liquid having the following characteristics:
a vapour pressure of less than 200 Pa at 20° C.;
1 part by volume dissolves at least 0.001 parts by weight of a catalyst of this invention; and
it is mixable with the silicon organic unsaturated compounds of the formula I.

Preferably, said solvent is selected from the group comprising arylalkanes. Typical examples of said solvents are decylbenzene, isopropyldiphenyl and phenylxylylethane.

The amount of organic substantially non-volatile solvent in the homogeneous barrier mixture of this invention is preferably of from 1 to 90% and, even most preferably, 1 to 20% (w/w).

The preferred silicon unsaturated organic compounds according to this invention have from 2 to 100 mmoles of unsaturated groups per 100 g of compound; most preferably, they have from 5 to 80 mmoles of unsaturated groups per 100 g.

Typically, n is an integer from 10 to 2000.

Preferred meanings of R and R' according to this invention are: 1–4 C alkyl, 2–10 C alkenyl and phenyl.

In turn, R" and R''' are preferably the same or different 2–10 C alkenyl.

Typical examples of catalysts according to this invention are palladium acetate; palladium, platinum or rhodium acetylacetonate; dimeric allylpalladiumchloride (PdCl(C3H5))2; tetrakis(triphenylphosphine)-palladium; bis-(chlorodicarbonyl)-rhodium and bis(dibenzyl-indeneacetone)-palladium.

The amount of catalyst (parts of transition metal in the homogeneous barrier mixture of this invention) is preferably of from 5 to 2000 ppm and, most preferably, 100 to 200 ppm.

The homogeneous barrier mixture according to this invention may also contain suitable additives such as, for example, thickening agents. Examples of suitable thickening agents are the colloidal silica having an average particle size of from 10 to 20 nm.

The person skilled in the art will easily estimate with good approximation the value of hydrogen gas that may penetrate from outside into an optical fibre cable or that may generate inside the cable (release of hydrogen gas adsorbed by the materials of the cable during the manufacturing processes or formed by decomposition of some of said materials) depending on to the cable structure, the materials of which it is formed, and the operating conditions. He is therefore in a position to estimate the minimum amount of homogeneous barrier mixture to be applied case by case.

Examples of optical cables and components thereof, which may be advantageously manufactured with the barrier composition of this invention to protect the optical fibres from hydrogen, are disclosed in the above cited documents U.S. Pat. No. 4,688,889 and UK-A-2172410, and also in the followings: EP-A-280279, FR-A-2200535, UK-A-1598540, UK-A-2021282, UK-A-2164471, UK-A-2170921, UK-A-2174822, U.S. Pat. Nos. 4,143,942, 4,153,332, 4,199,224, 4,491,386, 4,491,387, 4,676,590, 4,690,498.

BRIEF DESCRIPTION OF THE DRAWINGS

The use of the barrier composition of the invention in connection with optical fiber cables of the type shown in U.S. Pat. Nos. 4,688,889 and 4,725,123 is illustrated in the accompanying drawings in which:

FIG. 2 is a perspective view of an optical fiber cable of the type shown and described in U.S. Pat. No. 4,725,123 and including the barrier composition of the invention.

DETAILED DESCRIPTION OF THE INVENTION

Figure 1:
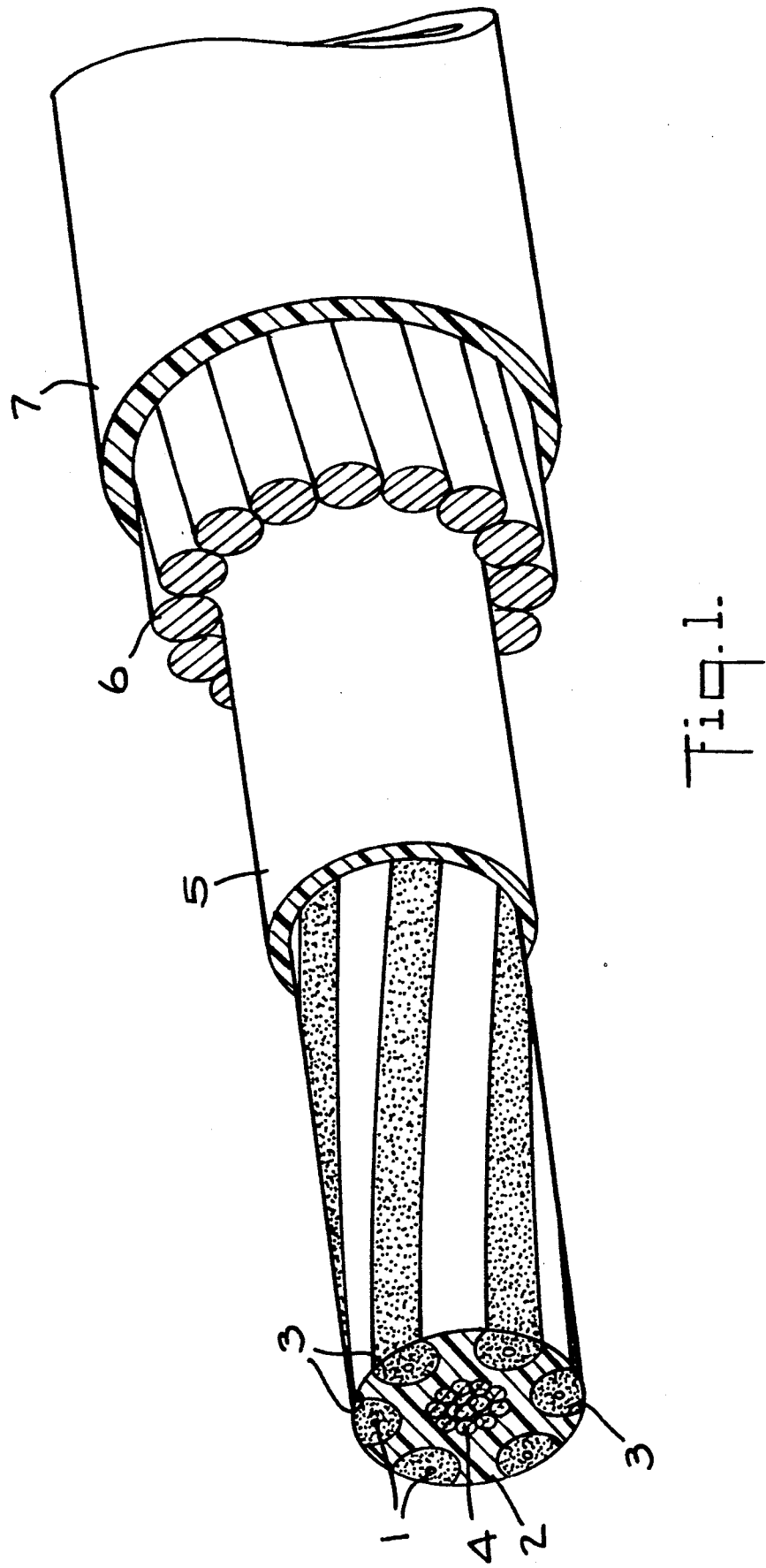
FIG. 1 is a perspective view of an optical fiber cable of the type shown and described in U.S. Pat. No. 4,688,889 and including the barrier composition of the invention.

The cables shown in FIGS. 1 and 2 are merely an example of optical fiber cables with which the barrier mixture of the invention may be used since it will be apparent to those skilled in the art that the barrier mixture may be incorporated in optical fiber cables of different types.

As shown in FIGS. 1 and 2, the optical fiber cables comprise suitable seats 3 for housing optical fibers 1. The said seats 3 may be helical grooves (FIG. 1) made in a core 2 made of plastic material or small plastic tubes (FIG. 2). The seats 3 are associated with sheaths 5 and 7 preferably made of plastic material as well as with elements 4 and 6 resistant to the traction.

As known to the person skilled in the art, the elements resistant to the traction are axially and/or peripherally located depending on the expected use of the cable and the manufacturing technology.

The element 4 in FIG. 1 is preferably made of glass-resin while the elements 4 in FIG. 2 and the elements 6 in FIG. 1 are preferably made of metal ropes.

In FIG. 1, the grooves 3 housing the optical fibers 1 are filled with the barrier mixture of the invention.

In FIG. 2, the barrier mixtuer fills the small plastic tubes 3 housing the optical fibers and/or the inner recesses 8 and/or the outer recesses 9 surrounding the small plastic tubes 3. Thus, the small plastic tubes 3 in FIG. 2 can be filled and/or surrounded by the barrier mixture of the invention.

The following example will illustrate the present invention without, however, limiting it in any way.

EXAMPLE

| | |
|---|---|
| vinyl terminated polydimethylsiloxane oil having a content of vinyl groups of 8.9 mmoles/100 g | 90.00 g |
| 0.5% (w/w) solution of dimeric allylpalladiumchloride (containing 58% of Pd) in decylbenzene (corresponding to 174 ppm of Pd) | 6.00 g |
| colloidal silica (average particle diameter = 12 nm) | 4.00 g |

The catalyst solution was added, under stirring, to the vinyl terminated polydimethylsiloxane oil. The thus obtained clear solution was thickened by addition of colloidal silica powder which was dispersed by a baffle disperser. Finally, the mixture was homogenized by passing through a three drum refiner.

TESTS

The capability of chemically hydrogen by the homogeneous barrier mixture of this invention was tested with a method based on measurements of the pressure drops occurring in a sealed container containing the material under examination in hydrogen atmosphere. The device was an apparatus for automatic pressure measurement within the range from 1 mbar to 1000 mbar. The apparatus was made by assembling a fixed volume chamber having two valves (one being a pin valve to control the hydrogen feeding, and the other one being a conventional valve to provide connection with a vacuum pump) to a commercial pressure transducer type E 8510 connected with a commercially available digital lector type EMV251, both manufactured by Edwards High Vacuum SpA. Inside the apparatus is housed a glass container. The control unity provided with digital reading of the pressure has a resolution of 1 mbar and the pressure reading is indipendent from the gas composition and the atmospheric pressure.

The tests were performed at a constant temperature of 23° C.

The glass container was weighted with a precision of 0.01 g (weight A), and then the bottom and wall of the container were uniformly spreaded with about 10 g of the homogeneous barrier mixture under examination. When the addition of the composition was over, the glass container was weighted a second time (weight B).

The glass container containing the homogeneous barrier mixture was housed in the apparatus and vacuum was applied for about 1-2 hrs. After having maintained the system under static vacuum for at least 12 hours, the container was connected to a hydrogen bottle until the digital pressure indicator showed the required pressure (usually about 500 or 1000 mbar).

The hydrogen bottle valve was closed and both the time and hydrogen pressure were recorded.

After 24 hours the residual hydrogen pressure was measured.

The hydrogen adsorbing capability in normal cm3/g was calculated with the following formula:

$$\frac{(P - Pr) \times V \times 273}{1013 \times (273 + C) \times (B - A)}$$

where:
P is the initial hydrogen pressure,
Pr is the residual hydrogen pressure after 24 hrs,
C is the temperature, in centigrade degrees, during the test
V is the free volume of the apparatus after spreading about 10 g of material,
B is the weight of the glass container with the material A is the weight of the empty glass container.

For each sample of barrier mixture the above cited test was performed twice and the mean of the obtained values was calculated.

In the case of the homogenous barrier mixture of the example, the operational conditions of the test and the relevant result were:

| | |
|---|---|
| chamber volume | = 108.80 cm³ |
| free volume | = 98.80 cm³ |
| initial hydrogen quantity (corresponding to 500 mbar) | = 48.8 normal cm³ = 4.35 × 10⁻³ g |
| final hydrogen quantity (corresponding to 318 mbar) | = 31.0 normal cm³ = 2.77 × 10⁻³ g |
| adsorbed hydrogen quantity | = 17.8 normal cm³ = 1.58 × 10⁻³ g |
| theoretical chemical adsorption | = 1.60 × 10⁻³ g. |

We claim:

1. An optical fibers cable comprising at least an optical fiber housed in a suitable seat, said optical fiber being protected against the damaging action of hydrogen by a barrier mixture capable of absorbing hydrogen chemically, characterized in that said barrier mixture is homogeneous in nature and comprise
    (a) at least a silicon unsaturated organic compound having more than 0.2 mmoles of unsaturated groups per 100 g of said compound and having the following general formula:

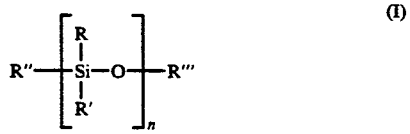
(I)

wherein:
   R and R', which may be the same or different, are alkyl, alkenyl or aryl
   R" and R'", which may be the same or different, are alkenyl, and
   n is an integer;
    (b) at least a catalyst selected from the group comprising inorganic and organic complexes of transition metals and organic salts of transition metals; and
    (c) at least an organic solvent substantially non-volatile.

2. An optical fibers cable according to claim 1, characterized in that the substantially non-volatile solvent is an arylalkane.

3. An optical fibers cable according to claim 1, characterized in that said solvent is decylbenzene.

4. An optical fibers cable according to claim 1, characterized in that said solvent is selected from isopropyldiphenyl and phenylxylylethane.

5. An optical fibers cable according to any one of claims from 1 to 4, characterized in that the amount of said substantially non-volatile organic solvent in the homogeneous barrier mixture is of from 1 to 90% (w/w).

6. An optical fibers cable according to any one of claims from 1 to 4, characterized in that the silicon unsaturated organic compound has from 2 to 100 mmoles of unsaturated groups per 100 g of compound.

7. An optical fibers cable according to claim 6, characterized in that the silicon unsaturated organic compound has from 5 to 80 mmoles of unsaturated groups per 100 g of compound.

8. An optical fibers cable according to any one of claims from 1 to 4, characterized in that n is an integer comprised from 10 to 2,000.

9. An optical fibers cable according to any one of claims from 1 to 4, characterized in that R and R', which may be the same or different, are a 1–4 C alkyl, a 2–10 C alkenyl or phenyl.

10. An optical fibers cable according to any one of claims from 1 to 4, characterized in that R" and R'", which may be the same or different, are a 2–10 C alkenyl.

11. An optical fibers cable according to any one of claims from 1 to 4, characterized in that the catalyst is selected from the group comprising palladium acetate; palladium, platinum or rhodium acetylacetonate; dimeric allylpalladiumchloride (PdCl(C3H5))2; tetrakis(-triphenylphosphine)-palladium; bis-(chlorodicarbonyl)-rhodium and bis(dibenzyl-indeneacetone)-palladium.

12. An optical fibers cable according to any one of claims from 1 to 4, characterized in that the amount of catalyst, in parts of transition metal in the homogeneous barrier mixture, is of from 5 to 2,000 ppm.

13. An optical fiber cable according to claim 12, characterized in that the amount of catalyst is of from 100 to 200 ppm.

14. An optical fibers cable according to any one of claims from 1 to 4, characterized in that the homogeneous barrier mixture also comprises a thickening agent.

15. An optical fibers cable according to claim 14, characterized in that the thickening agent is a colloidal silica having an average particle size of from 10 to 20 nm.

16. A component for optical fiber cables consisting of a suitable seat wherein at least an optical fiber is loosely housed, said optical fiber being protected against the damaging action of hydrogen by a barrier mixture capable of absorbing hydrogen chemically, characterized in that said barrier mixture is homogeneous in nature and comprise
    (a) at least a silicon unsaturated organic compound having more than 0.2 mmoles of unsaturated groups per 100 g of said compound and having the following general formula:

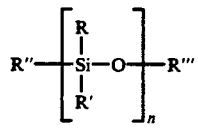

wherein:
R and R', which may be the same or different, are alkyl, alkenyl or aryl
R" and R'", which may be the same or different, are alkenyl, and
n is an integer;
(b) at least a catalyst selected from the group comprising inorganic and organic complexes of transition metals and organic salts of transition metals; and
(c) at least an organic solvent substantially non-volatile.

17. A component for optical fiber cables according to claim 16, characterized in that the substantially non-volatile solvent is an arylakane.

18. A component for optical fiber cables according to claim 17, characterized in that said solvent is decylbenzene.

19. A component for optical fiber cables according to claim 16, characterized in that said solvent is selected from isopropyldiphenyl and phenylxylylethane.

20. A component for optical fiber cables according to any one of claims from 16 to 19, characterized in that the amount of said substantially non-volatile organic solvent in the homogeneous barrier mixture is of from 1 to 90% (w/w).

21. A component for optical fiber cables according to any one of claims from 16 to 19, characterized in that the silicon unsaturated organic compound has from 2 to 100 mmoles of unsaturated groups per 100 g of compound.

22. A component for optical fiber cables according to claim 21, characterized in that the silicon unsaturated organic compound has from 5 to 80 mmoles of unsaturated groups per 100 g of compound.

23. A component for optical fiber cables according to any one of claims from 16 to 19, characterized in that n is an integer comprised from 10 to 2,000.

24. A component for optical fiber cables according to any one of claims from 16 to 19, characterized in that R and R', which may be the same or different, are a 1–4 C alkyl, a 2–10 C alkenyl or phenyl.

25. A component for optical fiber cables according to any one of claims from 16 to 19, characterized in that R" and R'", which may be the same or different, are a 2–10 C alkenyl.

26. A component for optical fiber cables according to any one of claims from 16 to 19, characterized in that the catalyst is selected from the group comprising palladium acetate; palladium, platinum or rhodium acetylacetonate; dimeric allylpalladiumchloride (PdCl(C3H5))2; tetrakis(triphenylphosphine)-palladium; bis-(chlorodicarbonyl)-rhodium and bis(dibenzyl-indeneacetone)-palladium.

27. A component for optical fiber cables according to any one of claims from 16 to 19, characterized in that the amount of catalyst, in parts of transition metal in the homogeneous barrier mixture, is of from 5 to 2,000 ppm.

28. A component for optical fiber cables according to claim 27, characterized in that the amount of catalyst is of from 100 to 200 ppm.

29. A component for optical fiber cables according to any one of claims from 16 to 19, characterized in that the homogeneous barrier mixture also comprises a thickening agent.

30. A component for optical fiber cables according to claim 29, characterized in that the thickening agent is a colloidal silica having an average particle size of from 10 to 20 nm.

31. A homogeneous barrier mixture capable of chemically absorbing hydrogen, thus protecting optical fibers of optically cables against said gas, characterized in that it consists of an homogeneous phase comprising
(a) at least a silicon unsaturated organic compound having more than 0.2 mmoles of unsaturated groups per 100 g of said compound and having the following general formula:

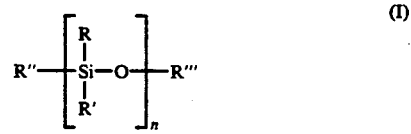

wherein:
R and R', which may be the same or different, are alkyl, alkenyl or aryl
R" and R'", which may be the same or different, are alkenyl, and
n is an integer;
(b) at least a catalyst selected from the group comprising inorganic and organic complexes of transition metals and organic salts of transition metals; and
(c) at least an organic solvent substantially non-volatile.

32. A homogeneous barrier mixture according to claim 31, characterized in that the substantially non-volatile solvent is an arylalkane.

33. A homogeneous barrier mixture according to claim 32, characterized in that said solvent is decylbenzene.

34. A homogeneous barrier mixture according to claim 31, characterized in that said solvent is selected from isopropyldiphenyl and phenylxylylethane.

35. A homogeneous barrier mixture according to any one of claims from 31 to 34, characterized in that the amount of said substantially non-volatile organic solvent in the homogeneous barrier mixture is of from 1 to 90% (w/w).

36. A homogeneous barrier mixture according to any one of claims from 31 to 34, characterized in that the silicon unsaturated organic compound has from 2 to 100 mmoles of unsaturated groups per 100 g of compound.

37. A homogeneous barrier mixture according to claim 36, characterized in that the silicon unsaturated organic compound has from 5 to 80 mmoles of unsaturated groups per 100 g of compound.

38. A homogeneous barrier mixture according to any one of claims from 31 to 34, characterized in that n is an integer comprised from 10 to 2,000.

39. A homogeneous barrier mixture according to any one of claims from 31 to 34, characterized in that R and R', which may be the same or different, are a 1–4 C alkyl, a 2–10 C alkenyl or phenyl.

40. A homogeneous barrier mixture according to any one of claims from 31 to 34, characterized in that R" and R"', which may be the same or different, are a 2-10 C alkenyl.

41. A homogeneous barrier mixture according to any one of claims from 31 to 34, characterized in that the catalyst is selected from the group comprising palladium acetate; palladium, platinum or rhodium acetylacetonate; dimeric allylpalladiumchloride (PdCl(C3H5))2; tetrakis(triphenylphosphine)-palladium; bis-(chlorodicarbonyl)-rhodium and bis(dibenzyl-indeneacetone)-palladium.

42. A homogeneous barrier mixture according to any one of claims from 31 to 34, characterized in that the amount of catalyst, in parts of transition metal in the homogeneous barrier mixture, is of from 5 to 2,000 ppm.

43. A homogeneous barrier mixture according to claim 42, characterized in that the amount of catalyst is of from 100 to 200 ppm.

44. A homogeneous barrier mixture according to any one of claims from 31 to 34, characterized in that it comprises also a thickening agent.

45. A homogeneous barrier mixture according to claim 44, characterized in that the thickening agent is a colloidal silica having an average particle size of from 10 to 20 nm.

* * * * *